Figures 1, 2, 3:
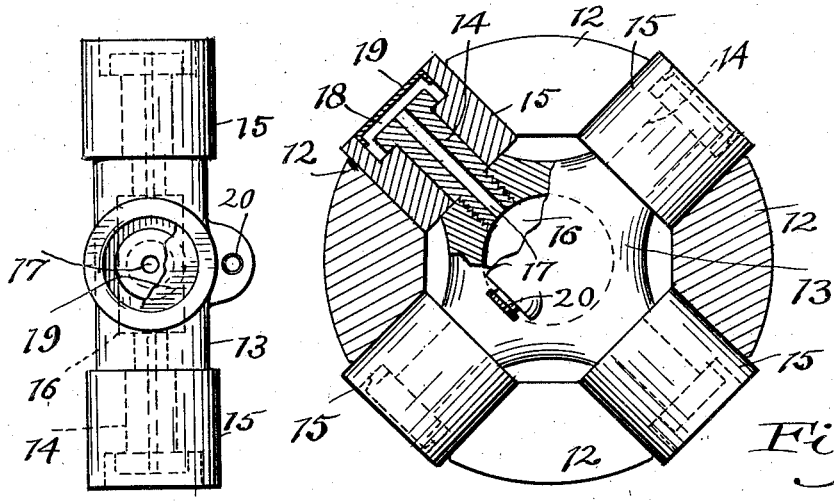

A. P. BRUSH.
UNIVERSAL JOINT.
APPLICATION FILED OCT. 26, 1917.

1,391,756.

Patented Sept. 27, 1921.

Inventor
Alanson P. Brush
By Thurston & Kwis
attys.

UNITED STATES PATENT OFFICE.

ALANSON P. BRUSH, OF DETROIT, MICHIGAN.

UNIVERSAL JOINT.

1,391,756.　　　Specification of Letters Patent.　　Patented Sept. 27, 1921.

Application filed October 26, 1917. Serial No. 198,591.

*To all whom it may concern:*

Be it known that I, ALANSON P. BRUSH, a citizen of the United States, residing at Detroit, in the county of Wayne and State of Michigan, have invented a certain new and useful Improvement in Universal Joints, of which the following is a full, clear, and exact description.

This invention relates to universal joints such for example, as are employed in motor vehicle drive mechanisms.

The principal object of the present invention is to provide a universal joint which has a free telescoping action between the driving and driven members, as well as universal action, and which is able to transmit torsional load without any substantial slip between the loaded surfaces.

In the attainment of the above objects I provide between the driving and driven members which are forked in substantially the usual manner, a spider having rollers or so-called anti-friction members between the forks of the driving and driven parts, this spider being a freely movable member unconnected with either part, so that while transmitting power between the parts it offers practically no resistance to axial or angular movements between them.

The invention may be further briefly summarized as consisting in certain novel details of construction and combinations and arrangements of parts which will be described in the specification and set forth in the appended claims.

In the accompanying sheet of drawings, Figure 1 is a side view of a universal joint embodying my invention; Fig. 2 is a sectional view substantially along the line 2—2 of Fig. 1, looking in the direction indicated by the arrows; and Fig. 3 is a plan view of the spider removed from the joint, showing parts in section.

10 and 11 represent the two main parts or members of the universal joint, either of which can be the driving or driven member.

These members have interfitting forked ends, the arm 12 of the forks being in planes at right angles to each other in the usual manner. It will be observed, however, that opposite side faces of each fork arm are inclined with respect to each other (see Fig. 2) and that the adjacent faces of adjacent fork arms are parallel, forming running or bearing surfaces for the rollers of the spider.

Power is transmitted from the driving member to the driven member through the medium of a spider 13, having four equally spaced radial bearing pins 14 for rollers 15 which are arranged between and engage the opposing faces of the fork arms of the driving and driven members.

The spider is, as before stated, unconnected with either member of the joint, and is held in position by the engagement of the rollers with the two pairs of fork arms. It is therefore free to move relative to both members 10 and 11 and permits free telescoping as well as universal movements.

The pins supporting the rollers sustain practically no part of the load, and the transmission of power and the relative movement between the driving and driven parts take place with substantially no slippage.

While the following construction is not essential to the invention, I prefer to provide for automatic lubrication of the bearing surfaces of the rollers on the bearing pins 14 by making the hub of the spider hollow, as shown at 16, and by providing centralaxial openings 17 through the bearing pins 14 through which the lubricant will pass by the action of centrifugal force. For the passage of lubricant from these openings or passageways 17 in the radial bearing pins, chambers 18 are preferably provided at the outer ends of the rollers, these chambers being closed in any suitable way such as by caps 19. Suitable means such as a removable plug 20 may be employed to supply lubricant to the chamber 18.

The universal joint above described, accomplishes in an effective manner the objects stated at the beginning of the specification, and at the same time the construction is inexpensive, it is durable, and transmits power with practically no frictional losses.

I do not desire to be confined to the exact details shown, but aim in my claims to cover all modifications which do not involve a departure from the spirit and scope of my invention in its broadest aspects.

Having described my invention, what I claim is:

1. A universal joint comprising two members, one adapted to drive the other, and provided with forked ends with the arms of one forked end between the arms of the other, and an intermediate power transmitting device having driving portions between adjacent arms of the two members and capable of moving freely relative to each member axially thereof.

2. A universal joint comprising driving and driven members with forked ends composed of straight arms, the arms of one member extending between the arms of the other, an intermediate power transmitting member capable of moving freely relative to each member axially thereof, said power transmitting member comprising a body having radially disposed rollers between the adjacent arms of the two members, said power transmitting member having a lubricant reservoir with provision for supplying lubricant to the bearing surfaces of the rollers.

3. A universal joint comprising two members, one adapted to constitute the driving, and the other the driven part, said members having forked portions with the arms of one part between the arms of the other, and an intermediate power transmitting device capable of moving relatively to each member, said device having anti-friction rollers between the adjacent arms of the two members.

4. A universal joint comprising two forked members with the arms of one fork between the arms of the other, adjacent arms having spaced substantially parallel adjacent sides, and a power transmitting device capable of moving axially relative to either member and having radially disposed cylindrical rollers engaging the adjacent faces of adjacent arms.

In testimony whereof, I hereunto affix my signature.

ALANSON P. BRUSH.